United States Patent [19]
Saeki et al.

[11] Patent Number: 5,674,331
[45] Date of Patent: Oct. 7, 1997

[54] PNEUMATIC TIRE WITH CARCASS TURNUP BETWEEN BELT EDGE CUSHION RUBBER AND UNDERTREAD RUBBER

[75] Inventors: Mitsutoshi Saeki, Shinshiro; Hikomitsu Noji, Hiratsuka, both of Japan

[73] Assignee: The Yokohama Rubber Co. Ltd., Tokyo, Japan

[21] Appl. No.: 598,603

[22] Filed: Feb. 12, 1996

[30] Foreign Application Priority Data

Mar. 14, 1995 [JP] Japan .................. 7-054040

[51] Int. Cl.$^6$ .................. B60C 9/18; B60C 11/00; B60C 15/00
[52] U.S. Cl. .................. 152/209 R; 152/532; 152/537; 152/552; 152/554
[58] Field of Search .................. 152/209 R, 532, 152/554, 537, 552, 526

[56] References Cited

U.S. PATENT DOCUMENTS

| | | | |
|---|---|---|---|
| 2,274,855 | 3/1942 | Wallace | 152/209 R |
| 3,157,218 | 11/1964 | Brown | 152/209 R |
| 3,759,306 | 9/1973 | Greiner et al. | 152/209 R |
| 4,349,061 | 9/1982 | Hirakawa et al. | 152/209 R |
| 4,588,009 | 5/1986 | Kitazawa et al. | 152/209 R |
| 4,913,207 | 4/1990 | Harakon et al. | 152/209 R |

*Primary Examiner*—Adrienne C. Johnstone
*Attorney, Agent, or Firm*—Nikaido, Marmelstein, Murray & Oram LLP

[57] ABSTRACT

A pneumatic tire wherein an end portion of a carcass layer is turned up from inside to outside of the tire around each bead core up to a buttress portion, and this turn-up end portion is clamped between a belt edge cushion rubber and an under-tread rubber.

2 Claims, 3 Drawing Sheets

PNEUMATIC TIRE WITH CARCASS TURNUP BETWEEN BELT EDGE CUSHION RUBBER AND UNDERTREAD RUBBER

BACKGROUND OF THE INVENTION

This invention relates to a pneumatic tire which improves productivity of the tire without deteriorating maneuvering stability and durability.

Pneumatic tires according to the prior art have ordinarily the structure shown in FIG. 3 of the accompanying drawings. A turn-up end portion 11a of a carcass layer 11 is positioned in the proximity of an upper part of a bead filler 12, and a belt edge cushion rubber 5 is interposed between the carcass layer 11 and an end portion 2a of an innermost belt layer 2 to improve a belt portion durability.

According to such a prior art structure, however, the requirement for improving maneuvering stability in proportion to higher performance of vehicles in recent years cannot be completely satisfied.

To satisfy this requirement, a so-called "high turn-up structure" tire, wherein the turn-up end portion 11a of the carcass layer 11 is turned up to the inside of the innermost belt layer 2 as shown in FIG. 4, has been proposed.

However, when the end portion of the carcass layer is turned up to a higher position, there occur the problems that the number of production steps increases and productivity of the tires is extremely low. On the other hand, a belt edge cushion rubber is interposed between the carcass layer and the innermost belt layer so as to prevent the occurrence of CBU (casing break-up) due to the mutual interference between the innermost belt layer and the carcass layer. When the end portion of the carcass layer is turned up to a high position as described above, the belt edge cushion rubber must be disposed outside the turn-up end portion, so that wrinkles are likely to occur in the belt edge cushion rubber or air reservoirs are likely to develop between the belt edge cushion rubber and the carcass layer due to a step in the proximity of the turn-up end portion.

Furthermore, the tire having such a high turn-up structure involves another problem that durability of the tire drops because a rigid step difference occurs at the belt edge portion.

SUMMARY OF THE INVENTION

It is an object of the present invention to provide a pneumatic tire which can improve tire productivity without deteriorating maneuvering stability and durability.

In a pneumatic tire having a structure in which a belt cushion rubber is disposed inside an end portion of an innermost belt layer at a tread portion in such a manner as to extend from the end portion of the innermost belt layer to a buttress portion and an under-tread rubber is disposed outside an end portion of an outermost belt layer in such a manner as to extend from the end portion of the outermost belt layer to the buttress portion, the object of the present invention described above can be accomplished by a pneumatic tire wherein the end portion of the carcass layer is turned up around each bead core from inside to outside of the tire up to the buttress portion, and this turn-up end portion is clamped between the belt edge cushion rubber and the under-tread rubber.

Because the end portion of the carcass layer is turned up to the buttress portion, the carcass layer comprises a plurality of layers and reinforces the tire side portion. In consequence, transverse rigidity increases and maneuvering stability can be improved. Because the end portion of the carcass layer is turned up to the buttress portion, a stress is likely to concentrate on this turn-up end portion during the revolution of the tire, but because the turn-up end portion is clamped between the belt edge cushion rubber and the under-tread rubber which are relatively more flexible than the carcass layer, the stress acting on the turn-up end portion can be distributed to these belt edge cushion rubber and under-tread rubber. Therefore, the occurrence of separation at the turn-up end portion can be checked and durability can be improved.

Further, the length of the turn-up end portion of the carcass layer to the buttress portion is smaller than the length of the turn-up end portion of the carcass layer in the prior art tires wherein the end portion of the carcass layer is turned up to the inside of the innermost belt layer of the tread portion, and the turn-up operation is can be carried out more simply. Therefore, productivity of the tire can be improved. Moreover, because the belt edge cushion rubber needs be disposed only on the outside portion of the carcass layer corresponding to the end portion of the innermost belt layer, it need not be disposed outside the turn-up end portion of the carcass layer as has been required for the prior art tires up to the inside of the innermost belt layer of the tread portion. Accordingly, troubles near the turn-up end portion of the carcass layer do not occur.

DESCRIPTION OF THE PREFERRED EMBODIMENTS

Figure 1:
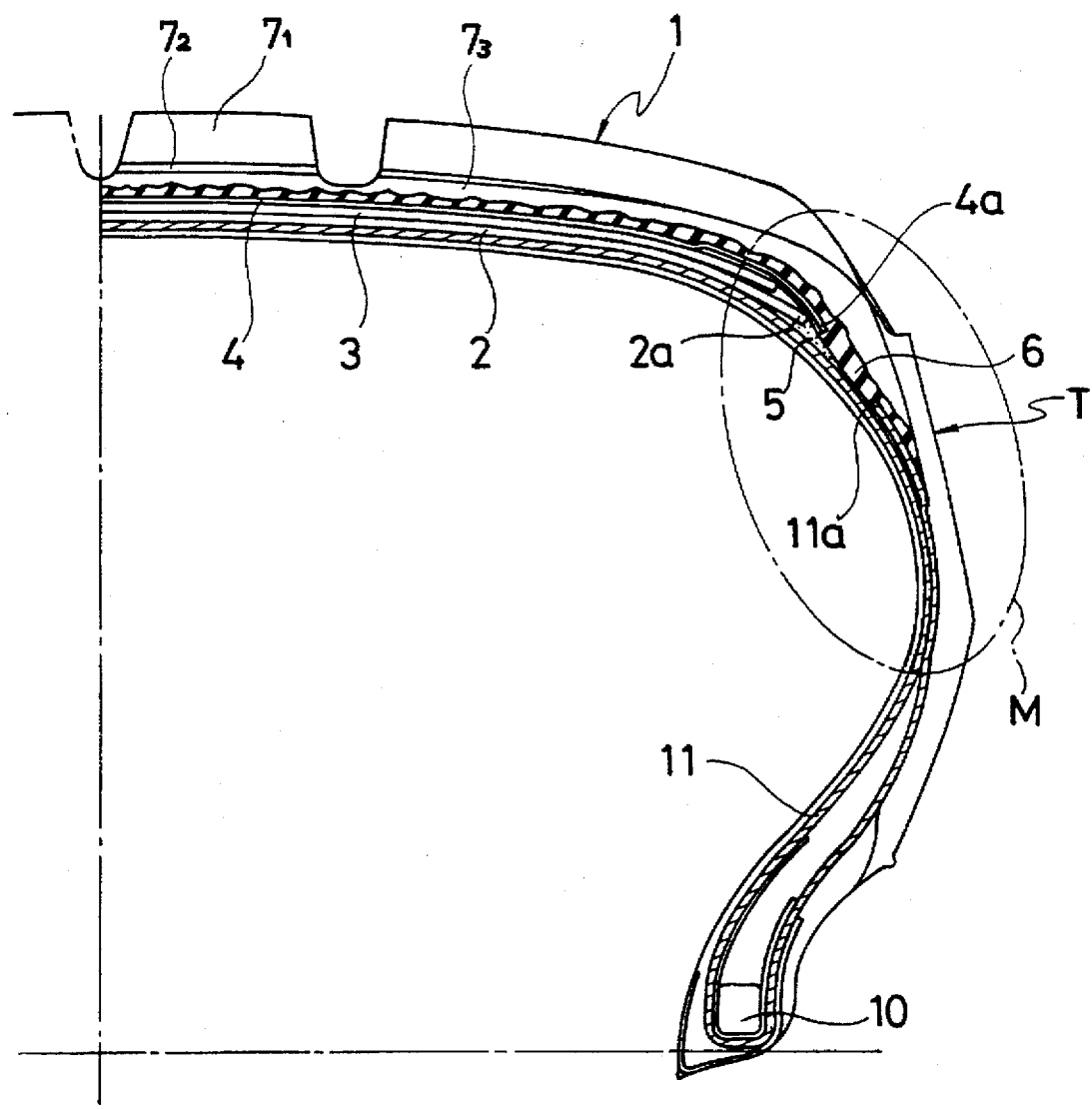
FIG. 1 is a semi-sectional explanatory view in a meridian direction of an example of pneumatic tires according to the present invention.
Figure 2:
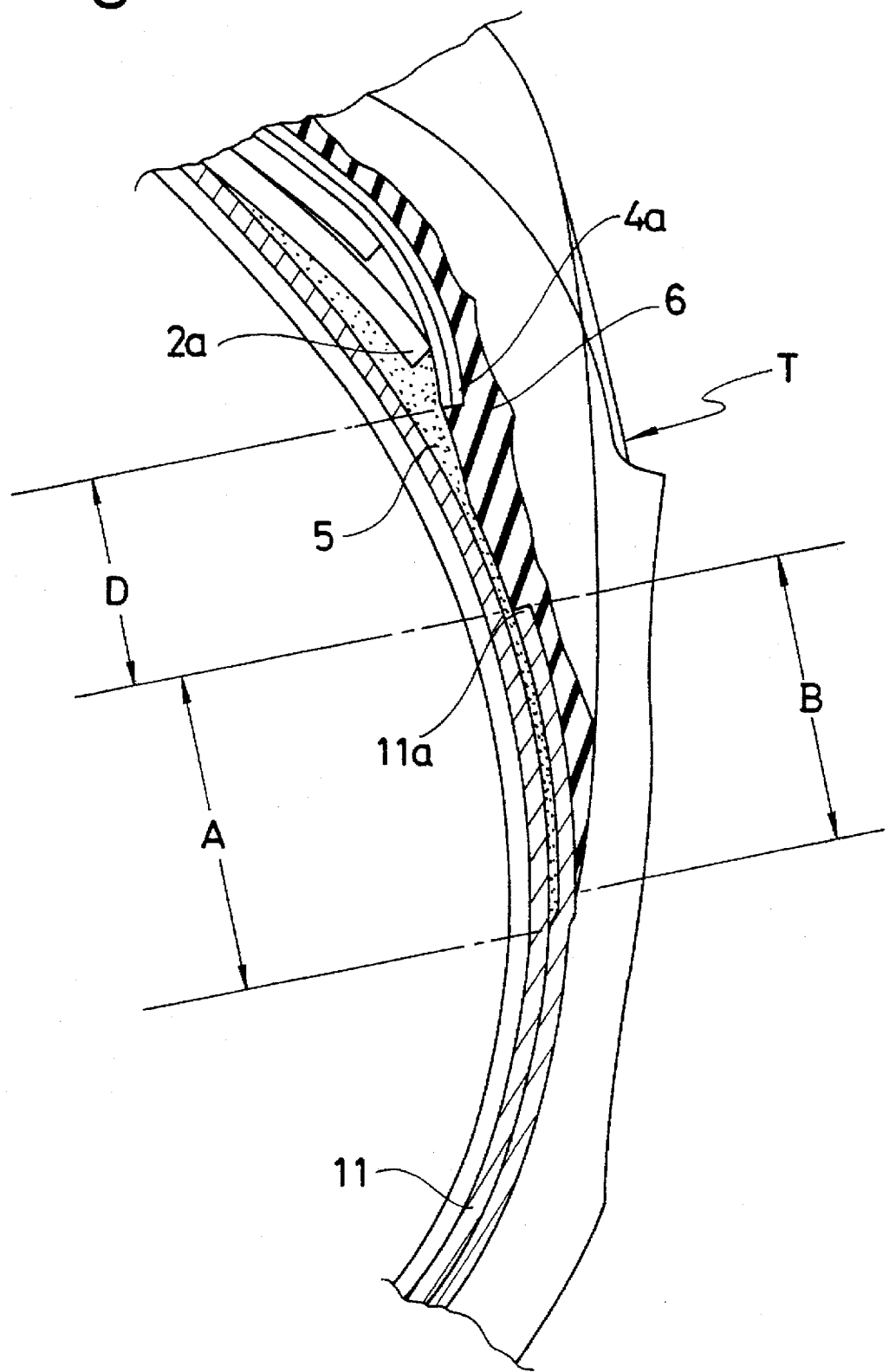
FIG. 2 is an enlarged view of a portion M in FIG. 1.

A three-layered belt layer comprising an innermost belt layer 2, an intermediate belt layer 3 and an outermost belt layer 4 is disposed at a tread portion 1 along the entire circumference of a tire as shown in FIGS. 1 and 2. A belt edge cushion rubber 5 is disposed inside an edge portion 2a of the innermost belt layer 2 in such a manner as to extend from the edge portion 2a of the innermost belt layer 2 to a buttress portion T. An under-tread rubber 6 is disposed outside an edge portion 4a of the outermost belt layer 4 in such a manner as to extend from the edge portion 4a of the outermost belt layer 4 to the buttress portion T. The under-tread rubber 6 is more flexible than cap tread rubbers $7_1$, $7_2$, $7_3$ of the tread portion 1 and plays the role of improving comfort to drive.

An end portion of a carcass layer 11 is turned up from inside to outside around a bead core 10 at each bead portion up to the buttress portion T, and this turn-up end portion 11a is clamped between the belt edge cushion rubber 5 and the under-tread rubber 6.

The clamped length of this turn-up end portion 11a, that is, the length A from the turn-up end portion 11a to the distal end of the belt edge cushion rubber 5 along a tire profile, and the length B from the turn-up end portion 11a to the distal end of the under-tread rubber 6 along the tire profile, are at least 5 mm and preferably from 6 to 20 mm, respectively.

The distance from the turn-up end portion 11a to the edge portion 4a of the outermost belt layer 4 along the tire profile (the distance from the turn-up end portion 11a to the edge portion 2a of the innermost belt layer 2 along the tire profile when the edge portion 2a of the innermost belt layer 2 protrudes towards the buttress portion T beyond the edge portion 4a of the outermost belt layer 4) D may be from 0 to 5 mm.

Both belt cushion rubber 5 and under-tread rubber 6 are more flexible than the cap tread rubbers $7_1$, $7_2$, $7_3$, the belt layers 2, 3, 4 and the carcass layer 11, and have JIS Hs of 55 to 65 and a 100% modulus of 2.0 to 3.0 MPa. Here, the term "JIS Hs" represents Japanese Industrial Standards Hardness measured on the JIS-A scale, and the term "100% modulus" represents a tensile stress at the time of 100% elongation.

When JIS Hs and 100% modulus are smaller than these lower limit values (JIS Hs 55 and 100% modulus 2.0 MPa), tread rigidity lowers so excessively that maneuvering stability drops. When they are greater than the respective upper limit values (JIS Hs 65 and 100% modulus 3.0 MPa), on the other hand, the tire cannot fully adsorb the stress acting on the turn-up end portions 11a and durability gets deteriorated. The belt edge cushion rubber 5 and the under-tread rubber 6 preferably have mutually approximate properties (JIS Hs and 100% modulus). The thickness (A portion) of the belt edge cushion rubber 5 clamped by the carcass layer 11 is preferably small and its width is preferably from 15 to 25 mm.

EXAMPLES

A pneumatic tire having a tire size of 195/60 R15 and the structure shown in FIG. 1 (tire of this invention) was produced. In this case, the tire had the following dimensions.

Belt edge cushion rubber 5:

A portion: thickness 0.5 mm, width 20 mm, JIS Hs 57, 100% modulus 2.5 MPa

Under-tread rubber 6:

thickness 1.0 mm, width 10 mm, JIS Hs 56, 100% modulus 2.5 MPa

Carcass layer 11:

steel cord (2+2(0.25)), two layers clamped length of the turn-up end portion 11a:

size A, 18 mm; size B, 17 mm; size D, 2 mm

Figure 4:
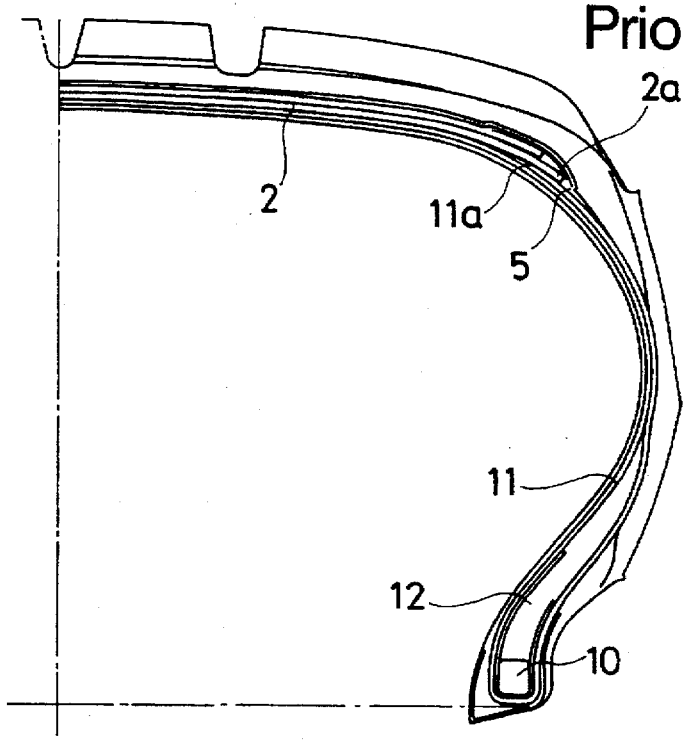
FIG. 4 is a semi-sectional explanatory view in the meridian direction of another example of the pneumatic tires according to the prior art.

Next, a pneumatic tire (Prior Art Tire 2) having the same structure as that of the tire of this invention was produced with the exception that the end portion of the carcass layer 11 was turned up to a length of 10 mm inside the innermost belt layer 2 from the end portion 2a of the innermost belt layer 2 in the direction of the tread center along the tire profile as shown in FIG. 4 and the belt edge cushion rubber 5 was disposed on the former.

Figure 3:
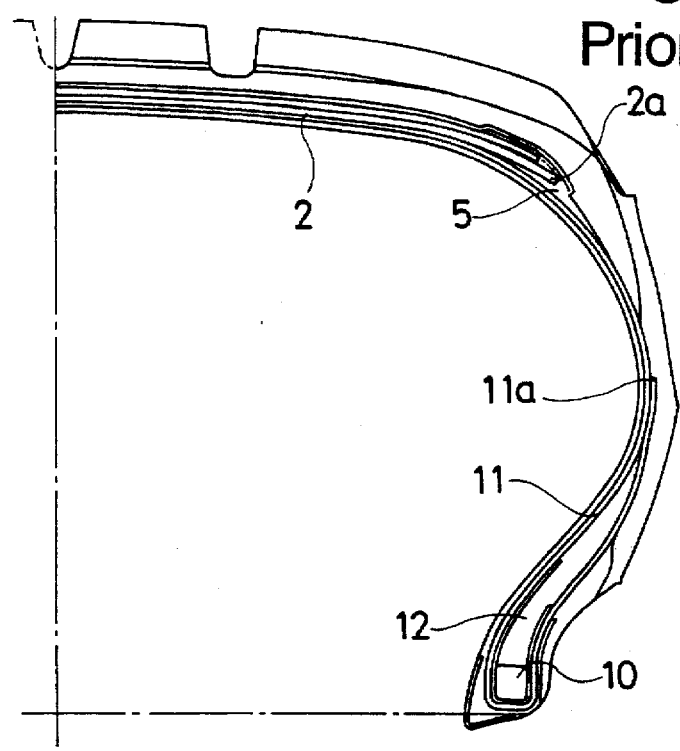
FIG. 3 is a semi-sectional explanatory view in the meridian direction of an example of pneumatic tires according to the prior art.

Another pneumatic tire (Prior Art Tire 1) having the same structure as that of the tire of this invention was produced with the exception that the turn-up end portion 11a was kept at a low position without overlapping the belt cushion rubber 5 and the turn-up end portion 11a of the carcass layer 11 as shown in FIG. 3.

Maneuvering stability and durability were evaluated for each of these tires in the following way. The results are tabulated in Table 1.

Maneuvering Stability

After the respective sample tires were fitted to an FR (front engine/rear drive) vehicle having a 2.0 liter-engine and the vehicle was run on the test course by a skilled driver, handling levels of the respective tires, that is, response characteristics, followup characteristics, under-steer characteristics, over-steer characteristics and grip limit predictability, were evaluated by feeling evaluation. Evaluation was expressed by the indexes using the evaluation of the Prior Art Tire 1 as 100. The greater the index values, the higher maneuvering stability.

Durability

A durability test was carried out for each of the tires by causing the tire to run on an indoor drum until the tire was broken by increasing a load at a constant pneumatic pressure and a constant speed. The evaluation was expressed by the indexes using the value of the Prior Art Tire 1 as 100. The greater the index value, the higher becomes durability.

TABLE 1

|  | Prior Art tire 1 | Prior Art tire 2 | Tire of this invention |
| --- | --- | --- | --- |
| maneuvering stability | 100 | 105 | 105 |
| durability | 100 | 92 | 102 |

As can clearly seen from Table 1, the tire of the present invention is more excellent in both maneuvering stability and durability than the Prior Art Tires 1 and 2.

As described above, in the tire according to the present invention, the end portion of the carcass layer is turned up from inside to outside the tire around the bead core up to the buttress portion, and this turn-up end portion is clamped between the belt edge cushion rubber and the under-tread rubber. Therefore, the present invention can improve productivity of the tire without deteriorating maneuvering stability and durability because the turn-up length is smaller than the turn-up length of the end portion of the carcass layer which is turned up to the inside of the innermost belt layer of the tread portion in the prior art tires, and the production steps can be reduced. Moreover, the belt edge cushion rubber needs only be disposed outside the carcass layer at a position corresponding to the edge portion of the innermost belt layer but need not be disposed outside the turn-up end portion of the carcass layer as has been required in the case of turn-up of the end portion of the carcass layer to the inside of the innermost belt layer of the tread portion in the prior art tires. Accordingly, troubles do not occur in the proximity of the turn-up end portion.

What is claimed is:

1. A pneumatic tire having a structure in which a belt edge cushion rubber is disposed inside each end portion of an innermost belt layer at a tread portion in such a manner as to extend from the end portion of said innermost belt layer to a buttress portion and an under-tread rubber is disposed outside each end portion of an outermost belt layer in such a manner as to extend from the end portion of said outermost belt layer to said buttress portion, the tire characterized in that an end portion of a carcass layer is turned up from inside to outside of said tire around a bead core at each bead portion up to said buttress portion, and this turn-up end portion is clamped between said belt edge cushion rubber and said under-tread rubber.

2. A pneumatic tire according to claim 1, wherein each of said belt edge cushion rubber and said under-tread rubber is more flexible than a cap tread rubber of said tread portion, said belt layers and said carcass layer and has JIS Hs of 55 to 65 and a 100% modulus of 2.0 to 3.0 MPa.

* * * * *